United States Patent
Wang et al.

(10) Patent No.: US 11,558,863 B2
(45) Date of Patent: Jan. 17, 2023

(54) METHOD FOR MULTIPLEXING MULTI-SERVICE UCI ON UPLINK DATA CHANNEL

(71) Applicant: CHINA ACADEMY OF INFORMATION AND COMMUNICATIONS, Beijing (CN)

(72) Inventors: Zhiqin Wang, Beijing (CN); Huiying Jiao, Beijing (CN); Ying Du, Beijing (CN); Guiming Wei, Beijing (CN); Fei Xu, Beijing (CN); Xia Shen, Beijing (CN); Zhiyu Yan, Beijing (CN); Xiaofeng Liu, Beijing (CN)

(73) Assignee: CHINA ACADEMY OF INFORMATION AND COMMUNICATIONS, Beijing (CN)

( * ) Notice: Subject to any disclaimer, the term of this patent is extended or adjusted under 35 U.S.C. 154(b) by 142 days.

(21) Appl. No.: 17/112,998

(22) Filed: Dec. 5, 2020

(65) Prior Publication Data
US 2021/0092735 A1 Mar. 25, 2021

Related U.S. Application Data

(63) Continuation of application No. PCT/CN2019/071427, filed on Jan. 11, 2019.

(30) Foreign Application Priority Data

Jun. 6, 2018 (CN) .......................... 201810574954.1

(51) Int. Cl.
H04W 72/04 (2009.01)
H04W 4/70 (2018.01)
(Continued)

(52) U.S. Cl.
CPC ...... *H04W 72/0413* (2013.01); *H04B 7/0626* (2013.01); *H04L 1/001* (2013.01);
(Continued)

(58) Field of Classification Search
CPC ... H04W 72/0413; H04W 4/70; H04W 80/02; H04B 7/0626; H04L 1/001;
(Continued)

(56) References Cited

U.S. PATENT DOCUMENTS

2011/0216677 A1 9/2011 Ahmadi et al.
2011/0268080 A1* 11/2011 Luo ..................... H04L 5/0053
370/336

(Continued)

FOREIGN PATENT DOCUMENTS

CN 102104467 A 6/2011
CN 102263617 A 11/2011
(Continued)

OTHER PUBLICATIONS

R1-1800054 Huawei, HiSilicon, Discussion on UCI feedback for URLLC, 3GPP TSG RAN WG1 Ad Hoc Meeting, Vancouver, Canada, Jan. 22-26, 2018 (Year: 2018).*
(Continued)

*Primary Examiner* — Mahbubul Bar Chowdhury
(74) *Attorney, Agent, or Firm* — Huan-Yi Lin

(57) ABSTRACT

The present application discloses a method for multiplexing multi-service UCI on an uplink data channel to solve the problem of different numbers of coded bits of UCI of different services. The method includes: regulating a value of a code rate offset of UCI relative to a UL-SCH, and calculating the number of modulation symbols for transmitting coded information according to the code rate offset. With the consideration that URLLC data requires higher reliability when UCI of the eMBB service is multiplexed on
(Continued)

a UL-SCH of the URLLC service, a corresponding numerical value is required to be smaller than 1. When UCI of a URLLC is multiplexed on a PUSCH of the eMBB, the code rate offset is increased. furthermore, high-layer signaling may include a scaling parameter. It is suitable to apply the method disclosed by the present application to different service multiplexing scenarios simultaneously.

6 Claims, 1 Drawing Sheet

(51) Int. Cl.
| | | |
|---|---|---|
| *H04B 7/06* | (2006.01) | |
| *H04L 1/00* | (2006.01) | |
| *H04L 1/18* | (2006.01) | |
| *H04L 5/00* | (2006.01) | |
| *H04W 80/02* | (2009.01) | |

(52) U.S. Cl.
CPC .......... *H04L 1/1819* (2013.01); *H04L 5/0055* (2013.01); *H04W 4/70* (2018.02); *H04W 80/02* (2013.01)

(58) Field of Classification Search
CPC ... H04L 1/1819; H04L 1/1671; H04L 1/1812; H04L 1/0072; H04L 1/00; H04L 1/1861; H04L 1/0003; H04L 1/0009; H04L 1/0026; H04L 1/0027; H04L 1/1607; H04L 5/0055
See application file for complete search history.

(56) References Cited

U.S. PATENT DOCUMENTS

| | | | | |
|---|---|---|---|---|
| 2011/0299500 A1* | 12/2011 | Papasakellariou | .. | H04W 72/042 370/329 |
| 2016/0066282 A1* | 3/2016 | Ouchi | ............... | H04W 72/0413 455/522 |
| 2019/0007182 A1* | 1/2019 | Li | ............................ | H04L 1/007 |
| 2019/0037586 A1* | 1/2019 | Park | ....................... | H04L 1/0031 |
| 2019/0166597 A1* | 5/2019 | Xiong | ................... | H04L 1/1861 |
| 2020/0288460 A1* | 9/2020 | Kim | ....................... | H04L 5/0055 |

FOREIGN PATENT DOCUMENTS

| | | |
|---|---|---|
| CN | 102461015 A | 5/2012 |
| CN | 102843216 A | 12/2012 |
| CN | 105917608 A | 8/2016 |
| CN | 107733616 A | 2/2018 |

OTHER PUBLICATIONS

R1-1801341 Huawei, HiSilicon, Remaining issues on UCI multiplexing, 3GPP TSG RAN WG1 Meeting #92, Athens, Greece, Feb. 26-Mar. 2, 2018 (Year: 2018).*
R1-1800073—Summary of remaining issues on UCI multiplexing, Huawei, 3GPP TSG RAN WG1 Ad Hoc Meeting, Vancouver, Canada, Jan. 22-26, 2018 (Year: 2018).*
R1-1803332—Summary of remaining issues for UCI piggyback on PUSCH, Qualcomm Incorporated, 3GPP TSG RAN WG1 Meeting #92, Athens, Greece, Feb. 26th-Mar. 2, 2018 (Year: 2018).*
Updated Text Proposal on Discussion [NR-AH1801#21][NR] 38.331 ASN.1 review part 3—L2 params (Hua Wei), R2-1804016, Mar. 2, 2018.
On UCI Multiplexing on PUSCH, Tdoc R1-1807253, May 25, 2018.
UL Multiplexing for URLLC, R1-1806893, May 25, 2018.
UCI Piggyback on PUSCH with URLLC Data, R1-1806121, 2018-5-25.
CN office action issued in CN 201810574954.1 dated Apr. 2, 2020.
International Search Report and Written Opinion dated Apr. 11, 2019 in International Patent Application No. PCT/CN2019/071427, filed on Jan. 11, 2019.

* cited by examiner

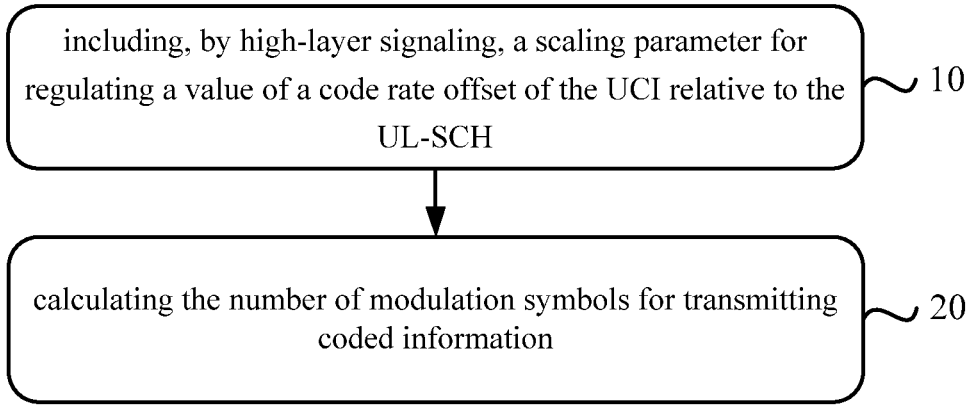

METHOD FOR MULTIPLEXING MULTI-SERVICE UCI ON UPLINK DATA CHANNEL

CROSS-REFERENCE TO RELATED APPLICATIONS

This is a continuation of International Patent Application No. PCT/CN2019/071427 filed Jan. 11, 2019, which claims the benefit of Chinese Patent Application No. 201810574954.1 filed Jun. 6, 2018. The entire disclosures of each of the above applications are incorporated herein by reference.

FIELD

The present application relates to the field of mobile communication and in particular to a method for multiplexing multi-service UCI on an uplink data channel.

BACKGROUND

An NR supports three service types including the eMBB service, the URLLC service and the mMTC service. For the URLLC service, the targets of use plane time delay of both the uplink and downlink are 0.5 ms. Generally, the reliability of one-time transmission of the URLLC is required as that: the reliability of transmitting a 32-byte packet is equal to 1-10^(-5) within the time delay (1 ms) on the user plane. Due to the diversity of service types, a situation that a plurality service types are multiplexed may appear. In NR system, a PUSCH may bear an uplink shared channel (UL-SCH) and/or uplink control information (UCI) transmitted by a terminal device. When different service types are multiplexed, a situation that data with different service types and UCI with different service types are multiplexed may appear.

When the UCI is transmitted on the PUSCH, a plurality of situations may appear in consideration of the plurality of services multiplexing. With eMBB and URLLC multiplexing as an example, for the first situation, UCI of the same service type (the eMBB or the URLLC) is multiplexed on the PUSCH so as to be transmitted; for the second situation, UCI of the eMBB is transmitted on a PUSCH of the URLLC; for the third situation, UCI of the URLLC is transmitted on a PUSCH of the eMBB; and there are different ways for determining the number of coded bits of UCI in the three situations.

SUMMARY

The present application provides a method for multiplexing multi-service UCI on an uplink data channel to solve the problem of different numbers of coded bits of UCI for different services.

An embodiment of the present application provides a method for multiplexing multi-service UCI on an uplink data channel, including: calculating the number of modulation symbols for transmitting coded information according to a code rate offset of UCI relative to UL-SCH based on a 36.213 standard; and including, by high-layer signaling, a scaling parameter for adjusting the value of the code rate offset.

Further, when UCI is multiplexed on a PUSCH with the same service type, a value identified by the scaling parameter is equal to 1.

Further, optionally, when UCI of a URLLC service is multiplexed on the PUSCH of an eMBB service, the value identified by the scaling parameter is smaller than 1.

Further, optionally, when UCI of the eMBB service is multiplexed on a PUSCH of the URLLC service, the value identified by the scaling parameter is larger than 1.

Preferably, in the embodiment of any methods provided by the present application, the UCI includes at least one of the following information: HARQ-ACK information and CSI. At least one scaling parameter is provided and is respectively used for at least one of the following parameters: a code rate offset of the HARQ-ACK information relative to the UL-SCH; and a code rate offset of the CSI relative to the UL-SCH.

In the embodiment of any methods provided by the present application, the high-layer signaling is dynamically or semi-statically configured.

In the embodiment of any methods provided by the present application, the service types include at least one of the eMBB, the URLLC and the mMTC.

At least one of the above-mentioned technical solutions adopted in embodiments of the present application may achieve the following beneficial effects:

In order to unify signaling setting in both cases of different service multiplexing and single service as much as possible, a method for indicating a code rate offset $\beta_{offset}$ is designed, and the method is to be simultaneously applied to different service multiplexing scenarios.

BRIEF DESCRIPTION OF THE DRAWINGS

The accompanying drawing described herein is provided for further understanding of the present application, and constitutes one part of the present application. Exemplary embodiments of the present application and descriptions thereof are intended to explain the present application, rather than to constitute inappropriate limitations on the present application. In the accompanying drawing:

FIG. 1 is a schematic diagram showing steps of a method for multiplexing multi-service UCI on an uplink data channel.

DETAILED DESCRIPTION OF THE EMBODIMENTS

In order to make objectives, technical solutions and advantages of the present application clearer, the technical solutions of the present application will be described clearly and completely below in conjunction with specific embodiments and the corresponding accompanying drawing of the present application. Obviously, the described embodiments are a part of the embodiments of the present application, not all the embodiments. Based on the embodiments in the present application, all other embodiments obtained by those of ordinary skill in the art without creative work shall fall within the protection scope of the present application.

A channel coding format of UCI of an eMBB in an NR is indicated by high-layer signaling via using an offset $\beta_{offset}$, a code rate offset of the channel of the UCI is calculated on the basis of the code rate of a UL-SCH, and thus, the number of modulation symbols for transmitting coded information are determined.

$\beta_{offset}$ is a code rate offset of the UCI relative to the UL-SCH and is configured by RRC, options of supported offsets are given in the way of lists in the standard, a table in which $\beta_{offset}$ is configured includes 32 possible numerical values, and all the numerical values are not smaller than 1.

Such a method is suitable for transmitting UCI of single service (an eMBB or a URLLC) on a PUSCH of the same service.

With a method for multiplexing HARQ-ACK on the PUSCH as an example, a resource for transmitting the HARQ-ACK (the number of the modulation symbols for transmitting the coded information) is calculated on the basis of the following formula:

$$Q' = \left\lceil \frac{O \cdot M_{sc}^{PUSCH} \cdot N_{symb}^{PUSCH} \cdot \beta_{offset}^{HARQ-ACK}}{\sum_{r=0}^{C-1} K_r} \right\rceil \quad \text{formula 1}$$

wherein O represents the number of bits of HARQ-ACK information, and $$\frac{M_{sc}^{PUSCH} \cdot N_{symb}^{PUSCH}}{\sum_{r=0}^{C-1} K_r}$$

represents a ratio of "the total number of the modification symbols included in the physical channel PUSCH" to "the total number of bits obtained after the UL-SCH is coded" in corresponding primary transmission and reflects a code rate of the UL-SCH. $\beta_{offset}^{HARQ-ACK}$ represents a code rate offset ($\beta_{offset}$) of the HARQ-ACK relative to the UL-SCH. Formula 1 and meanings of symbols such as M and N refer to the standard 36.213.

With the consideration of the transmission of the UCI multiplexed on the UL-SCH of the PUSCH with different service types and the difference of reliable transmission of the different service types in the present patent, a scaling factor/parameter $\beta_{scale}$ is introduced to calculate the number of bits obtained after the channel of the UCI is coded, and the parameter $\beta_{scale}$ is indicated by dynamic signaling.

The technical solutions provided by all the embodiments of the present application are described in detail below in conjunction with the accompanying drawings.

FIG. 1 is a schematic diagram showing steps of a method for multiplexing multi-service UCI on an uplink data channel. An embodiment of the present application provides a method for multiplexing multi-service UCI on an uplink data channel, including the following steps.

Step 10, high-layer signaling includes a scaling parameter for regulating a value of the code rate offset of UCI relative to the UL-SCH.

For example, with the consideration that URLLC data requires higher reliability when UCI of an eMBB is multiplexed on a UL-SCH of a URLLC data service, a corresponding numerical value is required to be smaller than 1. When UCI of a URLLC is multiplexed on a PUSCH of the eMBB, $\beta_{offset}$ is required to be further increased on the basis of an existing table, so that there are more code modulation symbols, the code rate of the UCI is reduced, and the reliability is improved.

In order to achieve such a purpose, it is proposed in the present patent that the scaling factor $\beta_{scale}$ is indicated by dynamic signaling or semi-statically configured signaling on the basis of an existing $\beta_{offset}$ table; when the $\beta_{offset}$ is required to be reduced, a numerical value of $\beta_{scale}$ is smaller than 1; when $\beta_{offset}$ is required to be increased, the numerical value of $\beta_{scale}$ is greater than 1; and when the multiplexed UCI service types are same, the numerical value of $\beta_{scale}$ is equal to 1. That is, when the numerical value of the $\beta_{scale}$ is indicated by the dynamic signaling, the regulated code rate offset $\beta'_{offset} = \beta_{scale} \times \beta_{offset}$ is adopted, wherein $\beta_{offset}$ is a numerical value in a RRC configuration list.

For example, when being used for HARQ-ACK, $\beta_{offset}$ is expressed as offset and is valued as the following table:

TABLE

Mapping of $\beta_{offset}$ values for HARQ-ACK information and the index signaled by higher layers

| $I_{offset,0}^{HARQ-ACK}$, $I_{offset,1}^{HARQ-ACK}$ or $I_{offset,2}^{HARQ-ACK}$ | $\beta_{offset}^{HARQ-ACK}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| ... | ... |

Note:
[data in the existing table is from TS 38.213 in NR Rel-15 standard]

When a terminal device (UE) transmits HARQ-ACK of which the bits are not greater than 2 bits, the high-layer configuration is $I_{offset,0}^{HARQ-ACK}$; when the UE transmits HARQ-ACK of which the bits are greater than 2 bits and smaller than or equal to 11 bits, the high-layer configuration is $I_{offset,1}^{HARQ-ACK}$; and when the UE transmits HARQ-ACK of which the bits are greater than 11 bits, the high-layer configuration is $I_{offset,2}^{HARQ-ACK}$.

Embodiment 1

Preferably, when UCI is multiplexed on a PUSCH with the same service type, a value identified by the scaling parameter is equal to 1.

Embodiment 2

Preferably, when UCI of the URLLC service is multiplexed on a PUSCH of the eMBB service, the value identified by the scaling parameter is bigger than 1.

Embodiment 3

Preferably, optionally, when UCI of the eMBB service is multiplexed on a PUSCH of the URLLC service, the value identified by the scaling parameter is smaller than 1.

Step 20, the number of modulation symbols for transmitting coded information is calculated according to the regulated code rate offset.

With a method for multiplexing the HARQ-ACK on the PUSCH as an example, due to the consideration of a situation that the UCI is transmitted on the PUSCH when different services are multiplexed, in the present patent, the numerical value of $\beta_{offset}$ in the configuration table is not changed, the scaling factor $\beta_{scale}$ is introduced, and the scaling factor is configured by dynamic signaling so that the number of coded bits of an HARQ-ACK information of a user is determined as:

$$Q' = \left\lceil \frac{O \cdot M_{sc}^{PUSCH} \cdot N_{symb}^{PUSCH} \cdot \beta_{offset}^{HARQ-ACK} \cdot \beta_{scale}^{HARQ-ACK}}{\sum_{r=0}^{C-1} K_r} \right\rceil \quad \text{formula 2}$$

Similar to formula 1, O described herein represents the number of bits of the HARQ-ACK information, and $$\frac{M_{sc}^{PUSCH} \cdot N_{symb}^{PUSCH}}{\sum_{r=0}^{C-1} K_r}$$

represents a ratio of "the total number of the modification symbols included in the physical channel PUSCH" to "the total number of bits obtained after the UL-SCH is coded" in corresponding primary transmission and reflects a code rate of the UL-SCH. Meanings of symbols such as M and N refer to the standard 36.213.

Different from formula 1, $\beta_{offset}^{HARQ-ACK} \cdot \beta_{scale}^{HARQ-ACK}$ scale reflects a value obtained after a code rate offset $\beta_{offset}^{HARQ-ACK}$ of the HARQ-ACK relative to the corresponding UL-SCH is regulated by using the scaling parameter $\beta_{scale}^{HARQ-ACK}$, that is, the regulated code rate offset $\beta'_{offset}$ is used as a value to decide the number of coded bits of an HARQ-ACK information.

The value of the code rate offset is regulated by the scaling parameter, then, the number of the modulation symbols for transmitting the coded information is calculated according to the code rate offset of the UCI relative to the UL-SCH, and thus, the number of the bits obtained after the channel of the HARQ-ACK information of the user is coded may be flexibly determined according to the different service types multiplexing.

Preferably, in the embodiment of any method provided by the present application, the UCI includes at least one of the following information: HARQ-ACK information and CSI. At least one scaling parameter is provided and is respectively used for at least one of the following parameters: a code rate offset of the HARQ-ACK information relative to the UL-SCH; and a code rate offset of the CSI relative to the UL-SCH.

That is, the numerical value of $\beta_{scale}$ is suitable for all UCI including the HARQ-ACK and the CSI. Moreover, the numerical value of $\beta_{scale}$ may be unified for all the UCI, that is, the numerical values of $\beta_{scale}$ corresponding to the HARQ-ACK and the CSI are unified; or, all different UCI is separately configured, that is, the HARQ-ACK information and the CSI may be configured with different numerical values of $\beta_{scale}$.

In the embodiment of any method provided by the present application, the high-layer signaling is dynamically or semi-statically configured.

In the embodiment of any method provided by the present application, the service type includes at least one of the eMBB, the URLLC and the mMTC.

As another embodiment of the present patent, with the consideration that the problem that UCI with different service types are multiplexed on a PUSCH may appear when eMBB and URLLC services are multiplexed, dynamic signaling is introduced to indicate a scaling factor/parameter $\beta_{scale}$ and a regulated code rate offset $\beta'_{offset} = \beta_{offset}/\beta_{scale}$ is used. When the same service type is multiplexed, the parameter $\beta_{scale}$ is configured to be 1; when UCI of a URLLC is multiplexed on uplink data of an eMBB, the parameter $\beta_{scale}$ is configured to be smaller than 1; and when UCI of the eMBB is multiplexed on uplink data of the URLLC, the parameter $\beta_{scale}$ is configured to be bigger than 1. In such a way, the transmission of the UCI on the PUSCH is realized when different services are multiplexed.

It is given in the present patent that there are different numerical values of $\beta_{offset}$ when UCI is multiplexed on the UL-SCH of different services. When the UCI of the eMBB service is multiplexed on the uplink data of the URLLC service, the numerical value of $\beta_{offset}$ may be smaller than 1, and when the UCI of the URLLC service is multiplexed on the uplink data of the eMBB service, the numerical value of $\beta_{offset}$ is required to be extended, wherein in one embodiment, the scaling factor/parameter $\beta_{scale}$ is introduced to regulate $\beta_{offset}$, and the regulated code rate offset is $\beta'_{offset} = \beta_{scale} \times \beta_{offset}$ or $\beta'_{offset} = \beta_{offset}/\beta_{scale}$.

It should be further noted that terms "include", "including" or any other variants thereof is intended to cover nonexcludable inclusion, so that a process, method, commodity or device including a series of elements not only includes those elements, but also includes other elements not listed clearly, or further includes inherent elements of the process, method, commodity or device. Under the condition that no more limitations are provided, elements defined by the word "including a . . . " do not exclude other same elements further existing in the process, method, commodity or device including the elements.

The above-mentioned description is only for the embodiments of the present application, but is not intended to limit the present application. Various alterations and changes on the present application can be made by the skilled in the art. Any modifications, equivalent replacements, improvements and the like made within the spirit and principle of the present application shall fall within the scope of claims of the present application.

What is claimed is:

1. A method for multiplexing multi-service Uplink Control Information (UCI) on an uplink data channel, comprising: calculating the number of modulation symbols for transmitting coded information according to a code rate offset of UCI relative to an uplink shared channel (UL-SCH), wherein a value of the code rate offset of the UCI relative to the UL-SCH is regulated; and when UCI of an Enhanced Mobile Broadband (eMBB) service is multiplexed on a UL-SCH of a Ultra-reliable and Low Latency Communications (URLLC) service, a corresponding numerical value is smaller than 1;

wherein higher-layer signaling comprises a scaling parameter for regulating the value of the code rate offset;

when the code rate offset is required to be reduced, a numerical value of the scaling parameter is smaller than 1; when the code rate offset is required to be increased, the numerical value of the scaling parameter is bigger than 1; and when UCI is multiplexed on a PUSCH with the same service type, a value identified by the scaling parameter is equal to 1.

2. The method according to claim 1, wherein when UCI of a URLLC service k multiplexed on an PUSCH of the eMBB service, the code rate offset is increased on the basis of table number 9.3-1 in an NR Rel-15 TS 38.213 version 2.0.0 2017-12 standard.

3. The method according to claim 1 or 2, wherein the UCI comprises at least one of the following information:
HARQ-ACK information and CSI.

4. The method according to claim 1 or 2, wherein a parameter of the higher-layer signaling is dynamically or semi-statically configured.

5. The method according to claim 1, wherein the service type comprises at least one of the eMBB, the URLLC and the mMTC.

6. The method according to claim 1, wherein at least one scaling parameter is provided and is respectively used for at least one of the following parameters:
- the code rate offset of the HARQ-ACK information relative to the UL-SCH; and
- the code rate offset of the CSI relative to the UL-SCH.

* * * * *